United States Patent [19]

Maher, III et al.

[11] Patent Number: 5,420,989
[45] Date of Patent: May 30, 1995

[54] COPROCESSOR INTERFACE SUPPORTING I/O OR MEMORY MAPPED COMMUNICATIONS

[75] Inventors: Robert D. Maher, III, Carrollton; John Eitrheim, Garland; Fred Dunlap, Dallas; Thomas B. Brightman, Plano, all of Tex.

[73] Assignee: Cyrix Corporation, Richardson, Tex.

[21] Appl. No.: 713,812

[22] Filed: Jun. 12, 1991

[51] Int. Cl.⁶ .................... G06G 9/30; G06F 15/16
[52] U.S. Cl. ...................... 395/375; 364/946.2; 364/923.6; 364/931.49; 364/288.6
[58] Field of Search ............... 395/275, 375, 400, 425, 395/775, 800

[56] References Cited

U.S. PATENT DOCUMENTS

| | | | |
|---|---|---|---|
| 4,144,562 | 3/1979 | Cooper | 364/DIG. 1 |
| 4,270,167 | 5/1981 | Koehler et al. | 395/325 |
| 4,315,308 | 2/1982 | Jackson | 395/325 |
| 4,407,016 | 9/1983 | Bayliss et al. | 395/275 |
| 4,547,849 | 10/1985 | Louie et al. | 395/325 |
| 4,729,094 | 3/1988 | Zolnowsky et al. | 395/200 |
| 4,833,596 | 5/1989 | Buckland et al. | 395/275 |
| 4,853,847 | 8/1989 | Dhuchi | 395/428 |
| 4,894,768 | 1/1990 | Iwasaki et al. | 395/200 |
| 4,926,318 | 5/1990 | Nakayama | 395/200 |
| 4,942,519 | 7/1990 | Nakayama | 395/775 |
| 4,959,557 | 9/1990 | Miller | 307/265 |
| 4,959,860 | 9/1990 | Watters et al. | 380/4 |
| 4,979,102 | 12/1990 | Tokuume | 395/325 |
| 4,994,961 | 2/1991 | MacGregor et al. | 395/650 |

*Primary Examiner*—David Y. Eng
*Attorney, Agent, or Firm*—Andrew S. Viger; John L. Maxin

[57] ABSTRACT

A coprocessor 18 comprises a bus controller 24 which further comprises a primary bus controller 28 and a secondary bus controller 30 that drive a floating point processor core 26. The primary bus controller 28 comprises a memory mapped bus interface 32 for processing memory mapped format instructions and an I/O bus interface 34 for processing conventional I/O format instructions. The primary bus controller 28 remains essentially transparent for execution of I/O format instructions and translates memory mapped format instructions into sequential bus cycles compatible to an I/O bus interface for processing conventional I/O format instructions, and for execution by the floating point processor core.

8 Claims, 4 Drawing Sheets

COPROCESSOR INTERFACE SUPPORTING I/O OR MEMORY MAPPED COMMUNICATIONS

TECHNICAL FIELD OF THE INVENTION

This invention relates in general to the field of digital electronics system and more particular to an improved coprocessor comprising a bus interface system operable to couple the coprocessor to the remainder of a microprocessor-based system.

BACKGROUND OF THE INVENTION

Conventional microprocessor-based systems communicate with peripheral devices through the data and address buses and a variety of control signals. Complex microprocessor-based systems may also comprise coprocessors capable of performing specific tasks more efficiently than the microprocessor itself. For example, floating point coprocessors have been used extensively in the IBM compatible personal computer environment which utilizes Intel microprocessor-based systems.

In general, during operation of these systems, the arithmetic coprocessor will examine the information present on the address and data buses and various control signals to determine if a particular instruction present on either of the buses may be executed by the coprocessor. Two basic methods of communicating instructions to arithmetic coprocessors have been used in the past. The first method is to treat the arithmetic coprocessor as a conventional input/output [I/O] peripheral device. Using this method of communication, an instruction is first transmitted to the coprocessor on the data bus. Any operands associated with the instruction are subsequently transmitted to the coprocessor on the same data bus. The second method of communicating instructions to arithmetic coprocessor involves the concept of memory mapped instructions. Using this method of communication, the microprocessor utilizes a WRITE instruction and writes data to a particular location in its logical address space. The coprocessor is actually resident in a particular block of logical address space. Each position in the logical address space associated with the coprocessor is associated with a different instruction. In this manner, a WRITE of a particular data value to a particular location may result, for example, in the calculation of the cosine of the data value. This method of communication is very efficient in that the instruction is communicated to the coprocessor on the address bus while the data associated with the instruction is simultaneously communicated on the data bus. This has a result of effectively doubling the bandwidth of communication within the integrated system.

Arithmetic coprocessors have been developed which utilize either of these communication formats. However, no arithmetic coprocessor has been developed which is capable of recognizing and processing instructions sent in both I/O instruction format and memory mapped instruction format. Accordingly, a need has arisen for an arithmetic coprocessor interface which is capable of recognizing and processing both formats of instructions.

SUMMARY OF THE INVENTION

In accordance with the teachings of the present invention, a coprocessor is provided which substantially reduces or eliminates problems associated with prior coprocessors.

The coprocessor of the present invention comprises a primary bus control circuit which is coupled to the address and data buses of a microprocessor-based system. The primary bus control circuit recognizes either I/O format instructions or memory mapped format instructions. In the case of an I/O format instruction, the primary bus control circuit remains transparent and allows the control signals to directly interface with a secondary bus controller which itself drives a floating point core which is operable to execute I/O format instructions. In the case of a memory mapped format instruction, the primary bus controller translates the instruction and generates the necessary bus cycles for the secondary bus controller to convert the memory mapped format instruction into a format recognizable by the floating point core. In this manner, both memory mapped format instructions and I/O format instructions may be performed by a single coprocessor system.

BRIEF DESCRIPTION OF THE DRAWINGS

A more complete understanding of the present invention may be acquired by referring to the accompanying Detailed Description of the Invention with reference to the accompanying drawings in which like reference numbers represent like features and wherein.

DETAILED DESCRIPTION OF THE INVENTION

Figure 1:
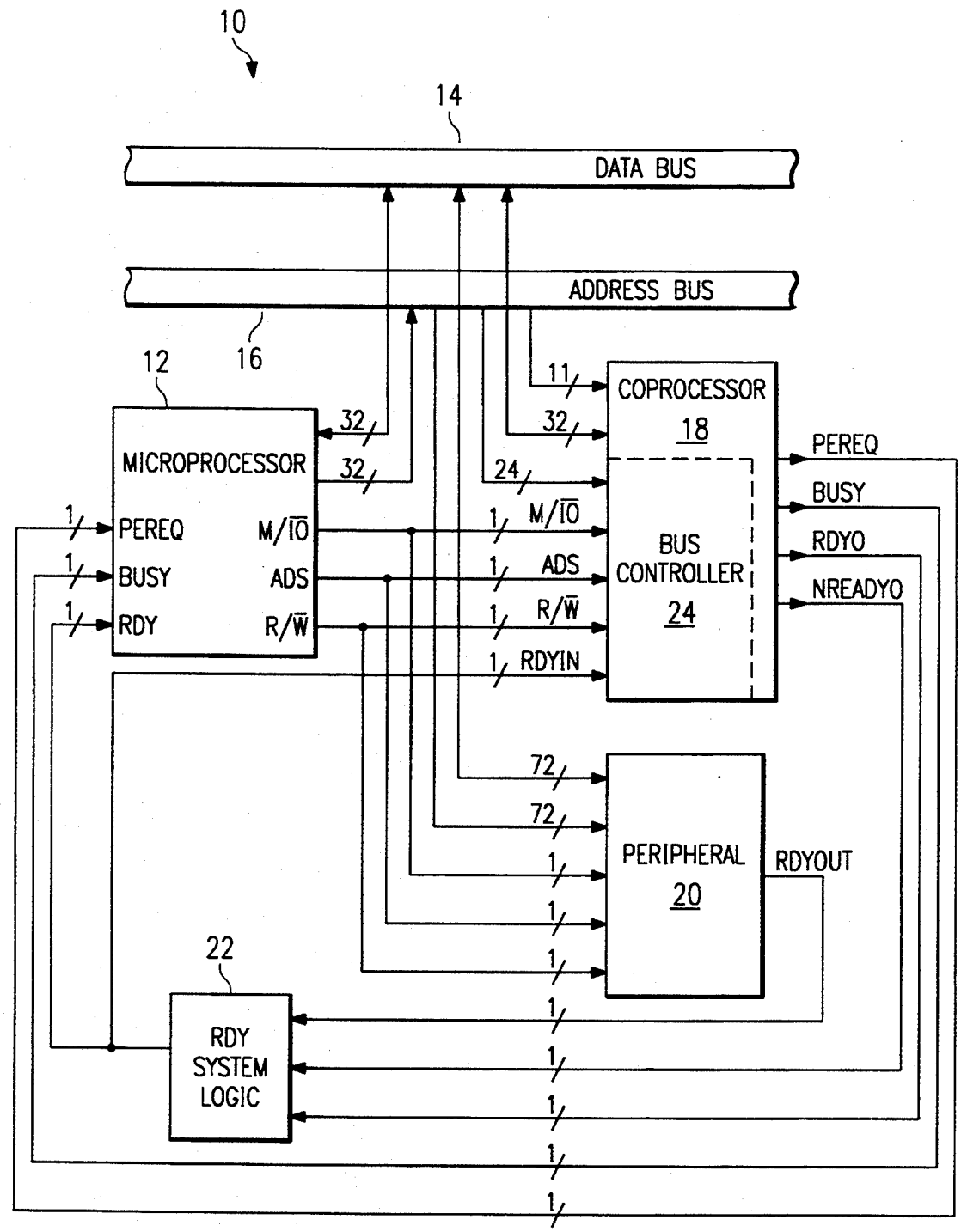
FIG. 1 is a schematic block diagram of a microprocessor-based system incorporating the coprocessor of the present invention.

FIG. 1 illustrates a data processing system 10 which comprises a microprocessor 12 bidirectionally coupled to a data bus 14 and an address bus 16. Microprocessor 12 may comprise, for example, an Intel 386 microprocessor. Data processing system 10 will be shown with illustrated data paths having widths corresponding to a 386-based machine. However, the selection of this particular embodiment is solely for the purposes of teaching important technical advantages of the present invention and should not be construed to limit the teachings of the present invention to any particular selection of microprocessor-based systems. Data processing system 10 also comprises a coprocessor 18 and a peripheral 20 also bidirectionally coupled to data bus 14 and address bus 16. In addition to being coupled to the data bus 14 and the address bus 16, microprocessor 12 is coupled to coprocessor 18 through a plurality of control signals. The first of these control signals is a memory-I/O select signal [M/IO] which is asserted by the microprocessor for accesses to memory locations and remains unasserted by the microprocessor for accesses to normal I/O peripheral devices.

The second control signal coupling microprocessor 12 to both coprocessor 18 and peripheral 20 is the address strobe signal [ADS]. The ADS signal is used by the various components of system 10 to indicate that an address placed on the address bus 16 is valid and generally indicates the initiation of a bus cycle by the microprocessor 12. The third control signal is the read/write signal [R/W̄]. The R/W̄ signal is asserted by the microprocessor during read operations and remains unasserted when the microprocessor is writing data values to peripheral chips such as coprocessor 18 or peripheral 20. Microprocessor 12 utilizes the three described control signals to communicate with coprocessor 18 and peripheral 20 using the known techniques involved in the conventional 386 system architecture. The architecture of system 10 is described herein to teach the operating environment of the coprocessor of the present invention. Peripheral 20 is included to indicate that the typical data processing system includes a plurality of peripheral devices sharing the data bus 14 and the address bus 16 and being controlled by a microprocessor such as microprocessor 12. Peripheral 20 might comprise any number of systems such as memory circuits, disk controllers, display systems, or the like. As will be described more completely herein, coprocessor 18 might comprise any number of slave processors such as an arithmetic floating point coprocessor, graphics coprocessor, or the like.

Coprocessor 18 comprises a monolithic integrated circuit formed on a single semiconductor substrate. As will be described herein, coprocessor 18 enjoys the unique technical advantage being able to process instructions dispatched in both conventional I/O format and memory mapped format using a single circuit chip. Coprocessor 18 examines the values presented on the address bus 16 and data bus 14 until it identifies an instruction or operation which it is capable of performing. Several control signals are generated by the coprocessor 18 to communicate its status in performing the instructions to the microprocessor 12. The coprocessor 18, constructed according to the teachings of the present invention, outputs two status signals, RDYO and NREADYO, to a RDY system logic circuit 22 shown in FIG. 1. Peripheral 20 is shown in FIG. 1 to output an RDY OUT signal to RDY system logic 22. RDY system logic circuit 22 outputs an RDY signal to microprocessor 12. Microprocessor 12 utilizes the RDY signal to tell when a particular peripheral has output the required data during a read operation or accepted the required data during a write operation. The RDY system logic circuit 22 effectively ORs all the RDY status signals from the various peripherals within data processing system 10. RDY system logic circuit 22 may also function to insert wait states where necessary. The RDY signal output from RDY system logic circuit 22 is also fed back into the coprocessor 18 as an RDY IN signal in order to inform the coprocessor 18 when the microprocessor 12 receives the RDY signal.

The coprocessor 18 also uses a peripheral request signal [PEREQ] and a busy signal [BUSY] to further communicate with the microprocessor 12. The BUSY signal is used to indicate to the microprocessor 12 that the coprocessor 18 has not yet completed the required instructions and that the microprocessor 12 should not dispatch any further instructions. The PEREQ signal is used by the coprocessor 18 to instruct the microprocessor when the coprocessor 18 has come to the point in its operations when data is required from the microprocessor 12.

Coprocessor 18 is shown in FIG. 1 to also comprise a bus controller 24 which is coupled to selected portions of the address bus 16 and the control signals discussed previously which were transmitted by microprocessor 12. Bus controller 24 is also coupled to the RDY IN signal fed back from RDY system logic circuit 22. As will be discussed herein, bus controller 24 serves to interface the coprocessor 18 with the instructions dispatched by the microprocessor 12 whether the instructions are in memory mapped format or I/O format.

Figure 2:
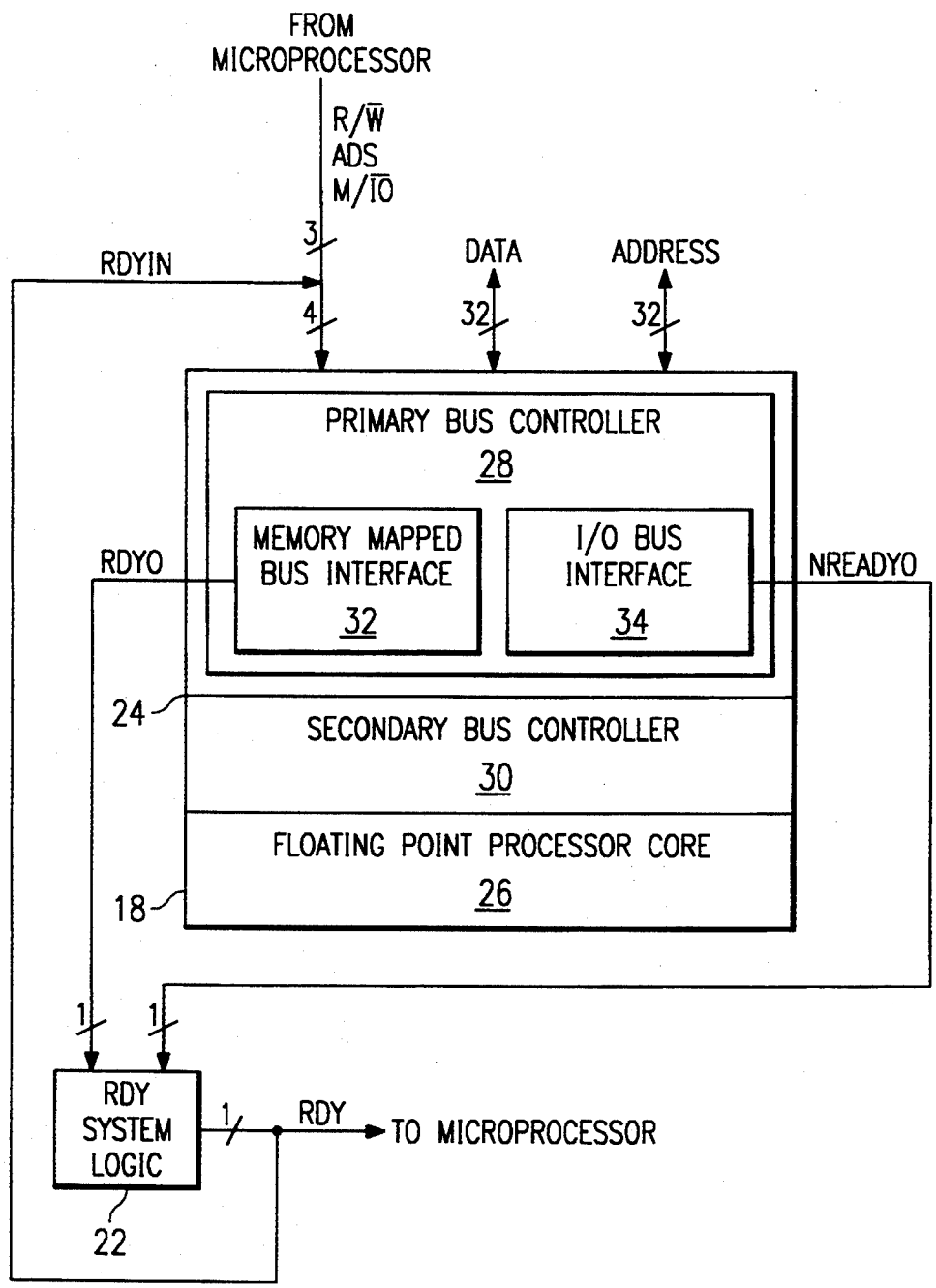
FIG. 2 is a schematic block diagram illustrating the coprocessor of the present invention.

Referring to FIG. 2, coprocessor 18 is shown to comprise the bus controller section 24 coupled to a floating point processor core 26. Bus controller 24 is shown to comprise a primary bus controller 28 and a secondary bus controller 30. Primary bus controller 28 is shown to further comprise a memory mapped bus interface 32 and an I/O bus interface 34. Memory mapped bus interface 32 outputs an RDYO signal to the RDY system logic circuit 22. I/O bus interface 34 outputs an NREADYO to the RDY system logic circuit 22. The primary bus controller receives the data and address values from the data and address buses and receives the four control signals discussed previously, R/W̄, ADS, M/ĪŌ, and RDY IN from the microprocessor.

The floating point processor core 26 comprises an arithmetic unit capable of performing floating point arithmetic functions such as, for example, the 83D87 math coprocessor manufactured and sold by Cyrix Corporation. The floating point processor core 26 together with the secondary bus controller 30 are capable of executing instructions dispatched to them in the typical I/O instruction format. The conventional I/O instructional format first dispatches the instruction to the floating point processor core 26 on the data bus and subsequently dispatches any required operands to the core 26 also on the data bus.

According to the teachings of the present invention, the primary bus controller 28 oversees the operation of both the I/O bus interface 34 and the memory mapped bus interface 32 such that when a conventional I/O format instruction is received by the coprocessor 18, the I/O bus interface 34 will dispatch the appropriate bus cycles through the secondary bus controller 30 to the floating point processor core 26. Further, when a memory mapped format instruction is received, the primary bus controller 28 will cause the memory mapped bus interface 32 to first dispatch a bus cycle to the secondary bus controller 30 causing the instruction to be transmitted to the floating point processor core 26 from the address bus. The memory mapped bus interface 32 will store the data received from the data bus necessary for the performance of the instruction and subsequently dispatch an operand bus cycle to the secondary bus controller 30 which causes the stored data to be transmitted to and accepted by the floating point processor core 26. Accordingly, the memory mapped bus interface 32 receives both the instruction and the data necessary for the performance of the instruction in the same bus cycle and transmits the instruction and data to the floating point processor core 26 using bus cycles that mimic the typical I/O instruction format.

Figure 3:
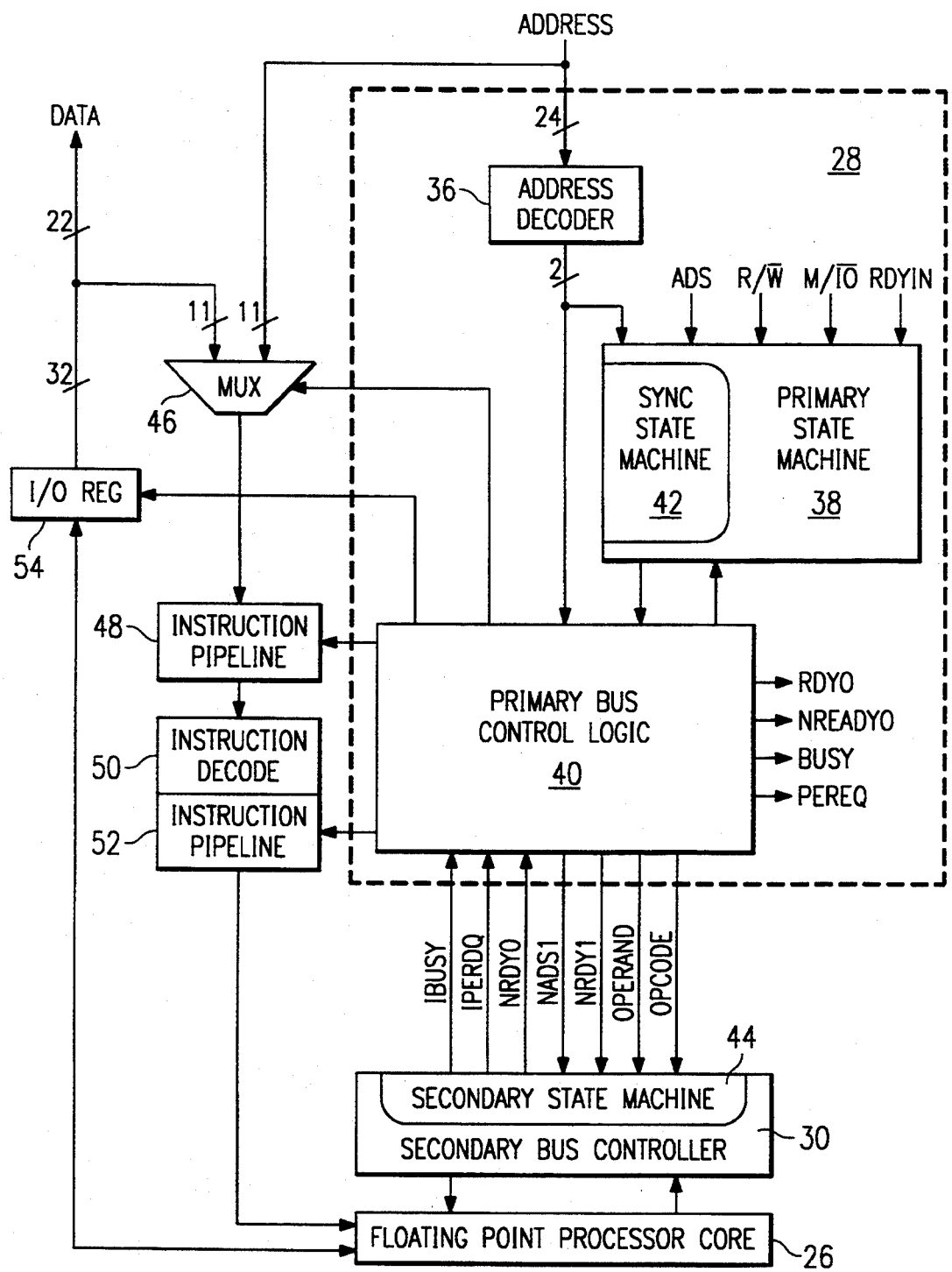
FIG. 3 is a schematic block diagram illustrating further details of the coprocessor of the present invention.

FIG. 3 illustrates the structure of primary bus controller in more detail, as well as illustrating the interrelationship of the primary bus controller to further components of the coprocessor system of the present invention. Primary bus controller 28 comprises an address decoder 36 which is coupled to the necessary bits of the address bus. For example, in a conventional 386 microprocessor-based system, the address decoder would be coupled to bits 31 through 24 and bits 15 through 0 of the address bus. These bits and control signals ADS, M/ĪŌ, R/W̄, and RDY IN comprise the bits necessary to detect the instructions intended for operation of a conventional floating point processor. The address decoder outputs two signals to a primary state machine 38 and primary bus control logic 40. The primary state machine 38 comprises a synchronizing state machine 42. The operation of the primary state machine 38 and the synchronizing state machine 42 will be explained more completely with reference to FIGS. 4 and 5 herein. The primary state machine 38 outputs a state value to the primary bus control logic 40. The primary bus control logic 40 outputs the signals necessary to drive a secondary state machine 44 which is a component of the secondary bus controller 30 discussed previously. The secondary bus controller 30 then provides the signals necessary to operate the floating point processor core 26 in a conventional manner as discussed previously.

The primary bus control logic 40 outputs a control signal to a multiplexer 46 which is coupled to eleven bits of the address bus and eleven bits of the data bus, as shown in FIG. 3. The multiplexer 46, in response to the control signal output by the primary bus control logic 40, selectively couples either of the eleven-bit groups to a first instruction pipeline register 48. The output of the first instruction pipeline register 48 is coupled to an instruction decode circuit 50 which outputs a decoded instruction to a second instruction pipeline register 52. The decoded instruction is output from instruction pipeline register 52 to the floating point processor core 26. All thirty-two bits of the data bus are coupled to an I/O register 54. I/O register 54 is selectively latched by a control signal output by the primary bus control logic 40.

The primary bus control logic 40 outputs four control signals to drive the secondary state machine 44 and, consequently, the secondary bus controller 30. An internal address strobe signal [NADSL] is output by the primary bus control logic 40 to indicate to the secondary bus controller 30 the beginning of a bus cycle. An internal ready signal [NRDYL] is transmitted by the primary bus control logic 40 to the secondary state machine 44 to indicate the termination of a bus cycle. An OPERAND signal is transmitted by the primary bus control logic 40 to indicate that the present bus cycle is being used to transmit a data value to the floating point processor core 26. Similarly, an OPCODE signal is transmitted by the primary bus control logic 40 to the secondary bus controller 30 to indicate that the present bus cycle is being used to transmit an instruction to the floating point processor core 26.

In general, the operation of the primary bus control logic 40 is controlled by the primary state machine 38 responsive to the signals received from the address decoder 36 and the four control signals discussed previously. It should be understood that because of the unique ability of the coprocessor of the present invention to handle instructions in either I/O or memory mapped format, a program being run on the system incorporated in the coprocessor of the present invention can include both formats of instructions and, consequently, the primary bus controller 28 must watch for both types of instructions and dispatch the necessary bus cycles for execution of both types of instructions. Generally, when an I/O format instruction is sensed by the primary state machine 38, the primary state machine 38 and the primary bus control logic 40 become essentially transparent and allow the signals from the address decoder 36 and the four control signals ADS, R/W̄, M/IO, and RDY IN to directly drive the secondary state machine 44. This is due to the fact that the secondary bus controller 30 and the floating point processor core 26 are designed to execute instructions in the conventional I/O instruction format. During the execution of the I/O instruction, the primary state machine 38 will still watch the activity on the address and data buses using synchronizing state machine 42 in order to keep track of the beginning and ending of all system bus cycles.

When a memory mapped format instruction is sensed by the primary state machine 38, the instruction will be present on the address bus and any data necessary for the instruction will be present on the data bus. The primary state machine 38 will cause the primary bus control logic 40 to latch the data into the I/O register 54 from the data bus. The primary bus control logic 40 will select the eleven lines from the address bus to pass through the multiplexer 46 through the first instruction pipeline register 48 and be decoded in the instruction decode circuit 50 and stored in the second instruction pipeline register 52. The primary state machine 38 will concurrently cause the primary bus control logic 40 to begin an instruction bus cycle by activating the NADSL signal and the OPCODE signal. The secondary bus controller 30 will then provide the required signals to the floating point processor core 26 to process the instruction stored in instruction pipeline register 52 and activate NRDYO signal to terminate the instruction bus cycle. When the floating point processor core 26 has received the instruction from the instruction pipeline register 52, the secondary bus controller 30 will activate the internal peripheral request signal, IPEREQ, to indicate the data required for the instruction may be transmitted. The primary bus control logic 40 will receive the IPEREQ signal and transmit the necessary signals to the primary state machine 38. The primary state machine 38 will then cause the primary bus control logic 40 to begin a data bus cycle by activating the NASDL signal and the OPERAND signal. These signals will cause the secondary state machine 44 and the secondary bus controller 30 to force the floating point processor core 26 to accept the required data from the I/O register 54. The secondary bus controller 30 will subsequently activate the NRDYO signal to terminate the OPERAND bus cycle. In this manner, the memory mapped format which presents both the instruction and the data required for execution of the instruction to the coprocessor 18 in the same bus cycle is translated into a conventional I/O format for execution by floating point processor core 26 which is capable of sequentially processing first the instruction and subsequently any data required for execution of the instruction. The bus cycles necessary for this translation function are controlled by the primary bus controller 28 through the use of the primary state machine 38 and the primary bus control logic 40, and are dispatched independent of any external system bus activity.

The primary state machine 38 also forces the primary bus control logic 40 to output the necessary signals for communication with the remainder of the system. As shown in FIG. 3, the primary bus control logic 40 outputs the RDYO signal, the NREADYO signal, the BUSY signal, and the PEREQ signal. As discussed previously, during the execution of an I/O format instruction, the BUSY signal and the PEREQ signal will be essentially directly coupled to the internal busy signal IBUSY and the internal peripheral request signal IPEREQ received from the secondary state machine 44. During the execution of memory mapped format instructions, primary state machine 38 causes the primary bus control logic 40 to activate the BUSY signal and deactivate the PEREQ signal to prevent microprocessor 12 from dispatching an I/O format instruction while the coprocessor 18 is busy executing an instruction.

The primary bus control logic 40 outputs two signals to the RDY system logic 22 discussed previously. The RDYO signal indicates to the remainder of the system that the memory mapped bus interface 32 described previously has completed a bus cycle while the NREADYO signal indicates to the remainder of the system that the I/O bus interface 34 described previously has completed a bus cycle. As such, the coprocessor 18 of the present invention actually appears to the remainder of the system as a memory mapped coprocessor and a conventional I/O format coprocessor operating in parallel.

The two signals generated by the address decoder 36 indicate whether the present instruction is in memory mapped format or I/O format. Each of the signals output by address decoder 36 is dedicated, respectively, to the memory mapped format or the I/O format. If neither of the signals is active, a bus cycle is present which is not intended for the coprocessor 18. In this case, the coprocessor 18 will be insensitive to the bus cycle and will track the bus activity via the synchronizing state machine 42. Both the signals coming out of the address decoder 36 cannot be active at the same time.

The first and second instruction pipeline registers 48 and 52 provide storage for sequential instructions received by the coprocessor 18. The first instruction pipeline register 48 cannot be made available to memory mapped format instructions dispatched by the microprocessor-based system. If the floating point processor core 26 is currently occupied performing a time consuming instruction and the system dispatches an additional instruction in memory mapped format, the instruction will be passed from the address bus through the multiplexer 46 through the first instruction pipeline register 48 to the instruction decode circuit 50 and second instruction pipeline register 52 for decoding and storage, respectively. Even though the floating point processor core 26 is still occupied and the primary bus control logic 40 will have activated the BUSY signal to attempt to hold the remainder of the system at bay, 386-based systems will not check the BUSY signal prior to dispatching a memory mapped format instruction. The data associated with the second dispatched instruction will simultaneously be present on the data bus and will be latched into the I/O register 54 by the primary bus control logic 40. In this situation, the first instruction pipeline register 48 is available for conventional I/O format instructions, but cannot be made available for memory mapped format instructions. This is due to the fact that if a memory mapped format instruction were to be stored in the first instruction pipeline register 48, there would be no place to store the data associated with that instruction as I/O register 54 is already storing the data associated with the prior instruction. Additionally, if the additional memory mapped format instruction was allowed to be stored in the first instruction pipeline register 48, the system might dispatch any one of a variety of I/O format instructions which do not check the BUSY signal prior to being dispatched and which may not acknowledge the NREADYO signal. Such a system always assumes that when the coprocessor is sent an I/O format bus cycle that it is ready for such a bus cycle, and, therefore, does not acknowledge the activation of the NREADYO signal, but, rather, activates the RDY IN signal on its own accord. In this case, there would be no place to store the subsequent instruction and the bus cycle would terminate without any effect on the coprocessor. Therefore, in the situation described above, if the next instruction were a memory mapped format instruction the bus cycle would be started with assertion of the ADS signal. However, the instruction would not be stored in the first instruction pipeline register 48 but will be held on the external buses until the second instruction pipeline register 52 is available. The hold mechanism is accomplished by asserting wait states until the second instruction pipeline register 52 can be loaded with new data. This is possible for memory mapped format instructions since 386-based systems make no assumptions about the RDYO signal.

Figure 4:
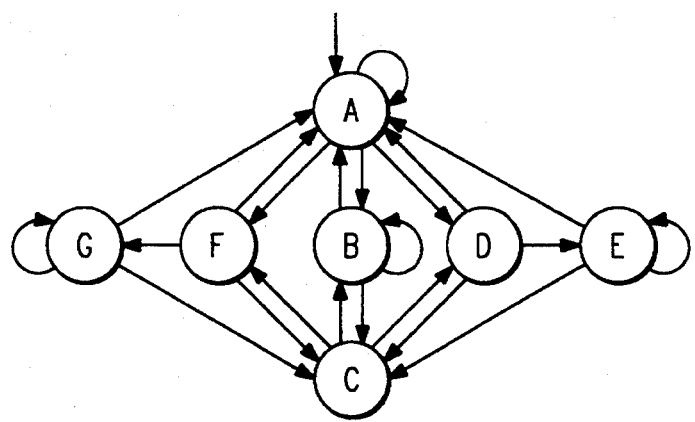
FIG. 4 is a state diagram illustrating the operation of the secondary bus controller state machine of the present invention.

FIG. 4 is a state diagram which illustrates the operation of the secondary state machine 44 which drives secondary bus controller 30 and, consequently, controls the operation of the floating point processor core 26. Referring to FIG. 4, the system enters a state A upon reset and will remain in state A until an active address strobe [NADSL] is received. As discussed previously, the secondary state machine 44 is driven by four control signals received from the primary bus control logic 40. These are the internal address strobe signal NADSL, the internal ready-in signal, NRDYL, the OPERAND signal, and the OPCODE signal. When an active address strobe signal is received, the secondary state machine 44 will enter either state B, state D, or state F, depending upon whether the bus cycle indicated by the active address strobe is an OPERAND bus cycle, an OPCODE or instruction bus cycle, or neither. If neither the OPERAND signal or the OPCODE signal are active, the secondary state machine will enter state B, where it will remain until it receives an active ready-in signal [NRDYL]. State B is occupied by the secondary state machine 44 when a bus cycle is asserted which is not meant for execution by the coprocessor 18. When the secondary state machine 44 receives an active ready signal, it will leave state B and either return to state A described previously, or will proceed to state C, which may be referred to as a pipeline state.

During the operation of conventional 386 microprocessor-based systems, the microprocessor may transmit a valid address prior to completion of the current bus cycle when the address is needed in advance to allow for slow address decoders to decode the address. Accordingly, it is possible to have the address already present on the address bus and the address strobe signal valid when the ready signal from the prior bus cycle is finally received. Thus, upon finishing a first bus cycle indicated by an active ready signal, the secondary state machine 44 looks to see if a pipeline bus cycle has already begun. If such is the case, both the address strobe signal and the ready signal will be active and the secondary state machine 44 will transition to state C shown in FIG. 4. The secondary state machine 44 will only remain in state C for one clock cycle and will immediately transition to either state B, D, or F during the next clock cycle. The secondary state machine 44 will return from state C to state B if neither the OPCODE or the OPERAND signal are active, indicating that the present pipeline bus cycle is not intended for execution by coprocessor 18.

In general, states D and E are associated with the execution of OPERAND bus cycles where data values are input into or output from the floating point processor core 26 from or to the I/O register 54. Similarly, states F and G shown in FIG. 4 are associated with the execution of OPCODE bus cycles where decoded instructions are passed from instruction pipeline register 52 into the floating point processor core 26. The interaction of states D and E with states A and C and the interaction of states F and G with states A and C are identical except for the fact that states D and E are executing OPERAND bus cycles and states F and G are executing OPCODE bus cycles as discussed previously.

The secondary state machine will enter state D from either state A or C when a new bus cycle is begun by an active address strobe signal and the OPERAND signal is active. If an active ready signal is present on the next clock cycle, the second state machine 44 will transition to state A or to state C, depending upon whether the next bus cycle is a conventional or a pipeline bus cycle, respectively. If the ready signal is not present on the next bus cycle, the secondary state machine 44 will transition from state D to state E where it will remain until the ready signal is present. Upon receipt of a ready signal in state E, the secondary state machine 44 will transition to state A or to state C depending upon the state of the address strobe indicating that the next bus cycle is a conventional or a pipeline bus cycle as discussed previously.

The operation of the secondary state machine 44 with respect to states F and G is identical as that described previously with reference to states D and E except that the OPCODE signal is active instead of the OPERAND signal during the transitions involving states F and G shown in FIG. 4.

The primary state machine 38 utilizes the synchronizing state machine 42 to keep track of the beginning and ending of bus cycles dispatched by the system. The synchronizing state machine 42 comprises a copy of the interaction of states A, B, and C, as shown in FIG. 4. As discussed previously, states A, B, and C allow the synchronizing state machine 42 to keep track of the bus cycles which are being executed by the system but which are not intended for execution by the coprocessor 18. As such, the synchronizing state machine 42 utilizes the interaction of states A, B, and C to indicate the beginning and ending of bus cycles and the presence of pipeline bus cycles while the primary state machine 38 is sequencing through its states. States D, E, F, and G are not included in the synchronized state machine 42. As such, synchronizing state machine 42 will enter state A upon reset of the system. Upon the beginning of any bus cycle indicated by an active address strobe signal [ADS], the synchronized state machine 42 will transition to state B, where it will remain until a ready signal [RDY IN] is received. The synchronized state machine 42 will then return to state A or will transition to state C, depending upon whether the subsequent bus cycle is a conventional or pipeline bus cycle, respectively. In this manner, the primary state machine 38 can always tell the current status of the system bus by testing the state of the synchronizing state machine 42.

Figure 5:
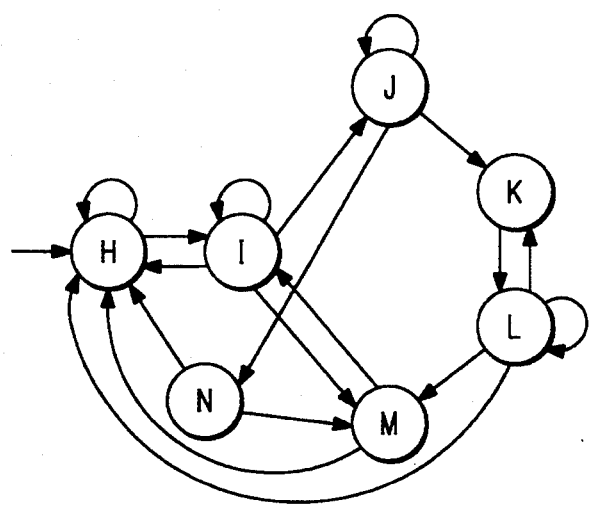
FIG. 5 is a state diagram illustrating the operation of the primary bus controller state machine associated with the coprocessor of the present invention.

The operation of the primary state machine 38 is illustrated in a state diagram format in FIG. 5. The primary state machine utilizes information received from the synchronizing state machine 42 and the four control signals ADS, R/$\overline{W}$, M/$\overline{IO}$, RDY IN, and the signals from the address decoder 36 and feedback signals from primary bus control logic 40 in order to drive the primary bus control logic 40. Referring to FIG. 5, upon system reset, the primary state machine 38 enters state H. The primary state machine 38 will remain in state H as long as no memory mapped instruction is dispatched. As discussed previously, the primary state machine 38 essentially remains transparent to conventional I/O format instructions and allows the external control signals to directly drive the secondary state machine 44 and consequently the floating point processor core 26. The primary state machine 38 does not actively create bus cycles using the primary bus control logic 40 until a memory mapped format instruction is dispatched by the system to the coprocessor 18.

The primary state machine 38 will transition to state I upon receiving a memory mapped instruction access. If the dispatched instruction does not require external operands, the primary state machine 38 will remain in state I until it receives an RDY IN signal from the RDY system logic 22 of FIGS. 1 and 2. The primary bus control logic 40 will assert NADSL and OPCODE to secondary bus controller 30 which responds by driving NRDYO. The primary bus control logic then transmits the NRDYO signal to the RDYO output pin, at which time it will return to state H upon receipt of the RDY IN signal. Many instructions executed by the floating point processor core 26 operate on data which is already stored within register files in the floating point processor core and thus require no external operands to be fetched.

If the address strobe is already active when the ready signal is received in state I, the primary state machine 38 will transition to state M shown in FIG. 5. State M is associated with pipeline bus cycles described previously. The presence of an active address strobe signal [ADS] when a ready signal [RDY IN] is received in state I indicates that the subsequent bus cycle is a pipeline bus cycle. From state M, the primary state machine 38 can return to state I if the subsequent bus cycle is a memory mapped instruction or return to state H if the subsequent bus cycle is not associated with a memory mapped instruction. If, at state I, the memory mapped instruction associated with the current bus cycle requires external operands, the primary state machine 38 will transition to state J where it will remain until the secondary state machine indicates that the floating point processor core 26 is ready for data to be transmitted. The primary state machine 38, upon receipt of an ADS signal for a memory mapped bus cycle, will cause the primary control logic 40 to immediately pass the instruction through the address bus through the multiplexer 46, first instruction pipeline 48, instruction decode circuit 50, and second instruction pipeline 52 into the floating point processor core 26. Simultaneously, the data from the data bus is latched into the I/O register 54. The RDYO signal is output from the primary bus control logic 40 to release the microprocessor and allow it to continue operations upon leaving state I. Accordingly, the internal operations of the coprocessor 18 are totally transparent to the microprocessor-based system which receives signals as if it were dealing with a memory mapped format coprocessor.

Upon receiving an indication that the secondary bus controller is ready for the data associated with the prior instruction, for example, by receiving the IPEREQ signal, the primary state machine 38 will transition from state J to state K and will initiate an OPERAND bus cycle by transmitting an active OPERAND signal from the primary bus control logic 40 to the secondary state machine 44. This will cause the floating point processor core 26 to accept the data from the I/O register 54.

After entering state K, the primary state machine 38 will transition from state K to state L on the next clock cycle, where it will remain until the secondary bus controller 30 indicates that the floating point processor core 26 has received or sent data from or to I/O register 54. Upon receiving an indication that the OPERAND transfer is complete, the primary state machine 38 will transition from state L to either state H, if no further instructions have been dispatched, or to state M if a bus cycle has begun involving an instruction intended for execution by coprocessor 18. The primary state machine 38 will return to state K if the operation being performed is a double precision store operation. State K will again initiate another OPERAND bus cycle where data output by the floating point processing core 26 is placed in a temporary register for retrieval by the 386 microprocessor-based system at a later time.

If, upon entering state J, the primary state machine 38 sees that the register file of the floating point processor core 26 is empty and the memory mapped operation is a READ operation, the primary state machine 38 will transition to state N where the present instruction will be aborted. This may occur when a memory mapped instruction is dispatched which requires operands from the coprocessor but the register file within the floating point processor core 26 contains no valid data. In this circumstance, the instruction is aborted and the primary state machine 38 will either return to state H to wait for further memory mapped instructions or will proceed to state M if a system bus cycle has already begun.

In summary, an arithmetic coprocessor has been described which allows for the sequential processing of instructions dispatched in either a memory mapped format or a conventional I/O format. A primary bus controller within the coprocessor dispatches required bus cycles to a conventional I/O format floating point processor core to allow for the transparent transmission of instructions in a conventional I/O format and the translation of memory mapped format instructions into bus cycles which will be understood by the floating point core.

It should be understood that, while the present invention has been described with reference to an embodiment that operates in conjunction with a floating point core operable to execute I/O format instructions, the teachings of the present invention are not limited to this or any particular embodiment. For example, according to an alternate embodiment of the present invention, a processor core operable to execute instructions presented in memory mapped format may be used in conjunction with a bus interface system operable to translate I/O format instructions into a format executable by the processor core. According to this embodiment, a pair of registers may be selectively loaded from the data bus to hold the decoded instruction and any data associated with the instruction. In this manner, the instruction and data may be presented to the memory mapped format processor core as required.

The coprocessor of the present invention enjoys the technical advantage of the ability to execute instructions in either memory mapped or I/O format. Many of the same arithmetic instructions, for example, exist in both formats in programs which are already in use. Accordingly, a single coprocessor constructed according to the teachings of the present invention can support programs that are written using conventional I/O format, memory mapped format or a mixture of both formats.

Although the present invention has been described in detail, it should be understood that various changes and substitutions may be made to the embodiments described herein without departing from the spirit and scope of the present invention, which is solely defined by the appended claims.

What is claimed is:

1. A coprocessor operable to execute instructions in either I/O or memory mapped format presented by a processing system which includes a processor, a data bus, and an address bus, where, for an I/O format instruction, the processor provides the instruction opcode and the instruction operand over the data bus in successive bus cycles, and where, for a memory mapped format instruction, the processor provides the instruction opcode over the address bus and the instruction operand over the data bus in the same bus cycle, the coprocessor comprising:

(a) a bus controller coupled to receive from the processor (i) control signals that identify whether an instruction provided by the processor is in I/O or memory mapped format, and (ii) memory mapped format instructions and I/O format instructions over the address and data buses;
   (b) the bus controller including I/O circuitry and memory map circuitry; and
   (c) a coprocessor core that executes instructions;
   (d) responsive to control signals for a memory mapped format instruction, the memory map circuitry generates associated translated control signals for an I/O format instruction;
   (e) responsive to control signals from the coprocessor for an I/O format instruction, the I/O circuitry provides the corresponding I/O format instruction received by the bus controller to the coprocessor core for execution; and
   (f) responsive to translated control signals from the memory map circuitry, the I/O circuitry provides the corresponding memory mapped format instruction received by the bus controller to the coprocessor core for execution.

2. The coprocessor of claim 1, wherein the I/O circuitry provides I/O format instructions and memory mapped format instructions to the coprocessor core by first providing the instruction opcode, and then providing the instruction operand.

3. The coprocessor of claim 2, wherein the bus controller includes:

(a) at least one instruction register, and
   (b) at least one I/O register;
   (c) for memory mapped format and I/O format instructions, the associated opcode being received into the instruction register, and the associated opcode being received into the I/O register; and
   (d) for each such instruction, the I/O circuitry being responsive respectively to corresponding control signals and translated control signals to transfer the opcode to the coprocessor core, and to enable the coprocessor core to obtain the corresponding operand from the I/O register.

4. A processing system including a processor and a coprocessor intercoupled by address and data buses, the coprocessor being operable to execute instructions in either I/O or memory mapped format presented by the processor, where, for an I/O format instruction, the processor provides the instruction opcode and the instruction operand over the data bus in successive bus cycles, and where, for a memory mapped format instruction, the processor provides the instruction opcode over the address bus and the instruction operand over the data bus in the same bus cycle, the processing system comprising:

(a) bus cycle control circuitry in the processor that generates control signals to identify whether an instruction provided by the processor to the coprocessor is in I/O or memory mapped format;

(b) a bus controller in the coprocessor coupled to receive from the processor (i) the control signals, and (ii) memory mapped and I/O format instructions;

(c) the bus controller including I/O circuitry and memory map circuitry; and (d) a coprocessor core in the coprocessor that executes instructions;

(e) responsive to control signals for a memory mapped format instruction, the memory map circuitry generates associated translated control signals for an I/O format instruction;

(e) responsive to control signals from the processor for an I/O format instruction, the I/O circuitry provides the corresponding I/O format instruction received by the bus controller to the coprocessor core for execution; and (f) responsive to translated control signals from the memory map circuitry, the I/O circuitry provides the corresponding memory mapped format instruction received by the bus controller to the coprocessor core for execution.

5. The processing system of claim 4, wherein the I/O circuitry provides I/O format instructions and memory mapped format instructions to the coprocessor core by first providing the instruction opcode, and then providing the instruction operand.

6. The processing system of claim 5, wherein the bus controller includes:

(a) at least one instruction register, and (b) at least one I/O register;

(c) for memory mapped format and I/O format instructions, the associated opcode being received into the instruction register, and the associated operand being received into the I/O register; and (d) for each such instruction, the I/O circuitry being responsive respectively to corresponding control signals and translated control signals to transfer the opcode to the coprocessor core, and to enable the coprocessor core to receive the corresponding operand.

7. A method of processing data in a processing system including a processor and a coprocessor intercoupled by address and data buses, the coprocessor being operable to execute in a coprocessor core instructions in either I/O or memory mapped format presented by the processor, where, for an I/O format instruction, the processor provides the instruction opcode and the instruction operand over the data bus in successive bus cycles, and where, for a memory mapped format instruction, the processor provides the instruction opcode over the address bus and the instruction operand over the data bus in the same bus cycle, comprising the steps:

(a) generating control signals that identify whether an instruction provided by the processor is in I/O or memory mapped format, (b) responsive to control signals from the processor for a memory mapped format instruction, generating in the coprocessor the associated translated control signals for an I/O format instruction;

(c) responsive to control signals from the processor for an I/O format instruction, providing the corresponding I/O format instruction to the coprocessor core for execution; and (d) responsive to translated control signals, providing the corresponding memory mapped format instruction received to the coprocessor core for execution.

8. The method of claim 7, wherein in the steps (c) and (d), providing an instruction to the coprocessor core is accomplished by first providing the instruction opcode, and then providing the instruction operand.

* * * * *